Oct. 17, 1939.  S. A. SNELL  2,176,692
VELOCIPEDE HANDLE BAR STRUCTURE
Filed Sept. 20, 1937
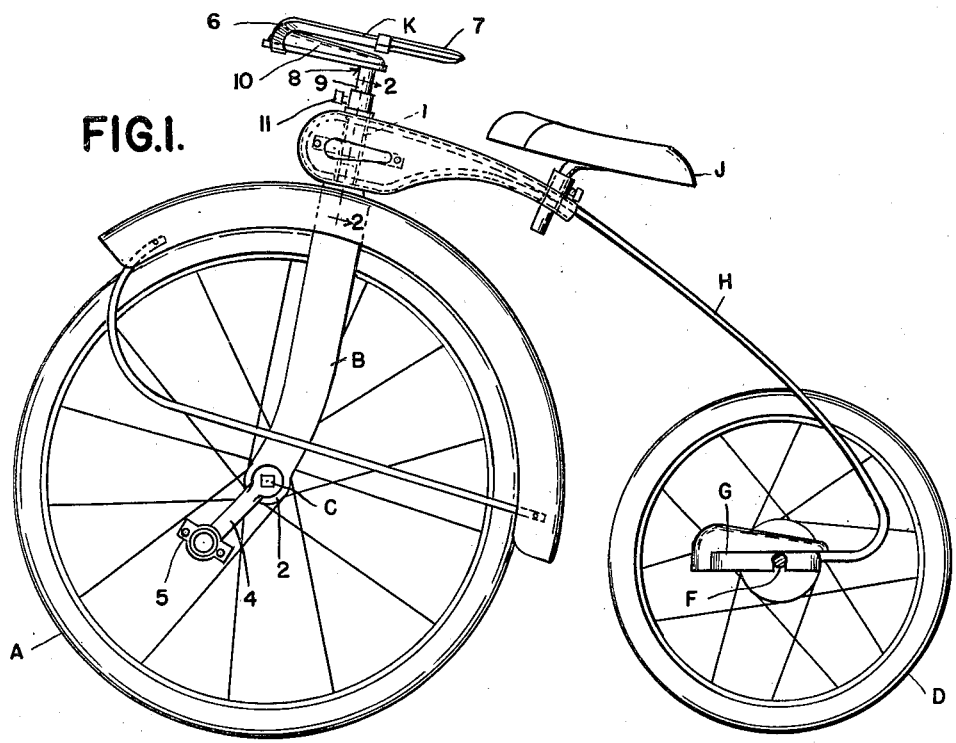
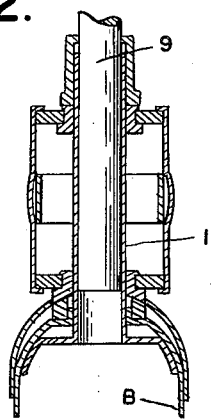
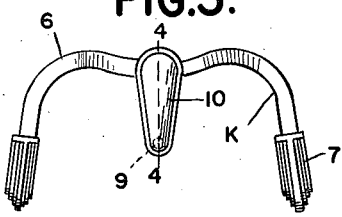
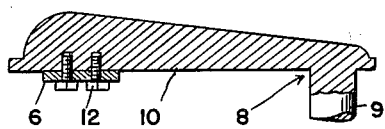
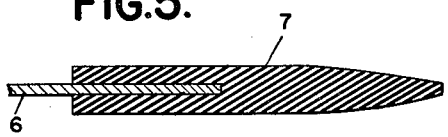
*INVENTOR*
SAMUEL A. SNELL
BY
*ATTORNEYS*

Patented Oct. 17, 1939

2,176,692

UNITED STATES PATENT OFFICE 2,176,692

VELOCIPEDE HANDLE BAR STRUCTURE

Samuel A. Snell, Toledo, Ohio, assignor to The American-National Company, Toledo, Ohio, a corporation of Ohio Application September 20, 1937, Serial No. 164,805

5 Claims. (Cl. 74—551.1)

This invention relates generally to juvenile vehicles such as velocipedes constitutes a continuation-in-part of my application filed March 22, 1937, bearing Serial No. 132,415.

One of the essential objects of the invention is to provide a velocipede handle bar structure wherein the crossbar thereof is flexible so that it will cushion the hands and arms of the rider from shocks and jars.

Another object is to provide a handle bar structure which dispenses entirely with unsightly connections between the crossbar and its supporting means.

Another object is to provide a handle bar structure that is strong and durable, simple in construction and economical to manufacture.

Other objects, advantages and novel details of construction of this invention will be made more apparent as this description proceeds, especially when considered in connection with the accompanying drawing, wherein:

Figure 1 is a fragmentary side elevation of a velocipede having a handle bar structure embodying my invention;

Figure 2 is a sectional view taken substantially on the line 2—2 of Figure 1;

Figure 3 is a top plan view of the handle bar;

Figure 4 is a sectional view taken substantially on the line 4—4 of Figure 3;

Figure 5 is a sectional view taken through one of the grips 7 and the adjacent portion of the arm 6.

Referring now to the drawing, I have illustrated a velocipede wherein A is the front wheel, B is a fork straddling the front wheel and having an upwardly extending tubular shank I, C is a shaft for said wheel journaled in the furcations 2 of the fork and provided at opposite ends thereof with suitable cranks 4 and pedals 5. As shown, the shank I is formed separately from the fork B and is suitably secured thereto. However, in so far as the present invention is concerned, the shank I may be formed in any suitable way relative to the fork.

D are the rear wheels, F is an axle for said rear wheels, and G is a platform on said axle. H is a backbone connected at its forward end to the shank I of the fork and at its rear end to the rear axle F and platform G. J is a seat mounted on the backbone, and K is a handle bar structure embodying my invention carried by the shank I of the fork.

Preferably the handle bar structure consists of a crossbar or steering arm 6, hand grips 7 and a supporting member 8. As shown, the steering arm 6 comprises a single strip of spring steel and is substantially U-shape in plan. The grips 7 comprise elongated molded bodies of rubber or rubber composition and are sleeved upon the ends of said strip 6. If desired, these grips 7 may be formed from other suitable plastic materials and may obviously have any suitable exterior configuration or contour. In Figures 1 to 5, inclusive, the supporting member 8 is a metal casting having a substantially cylindrical post portion 9 and a substantially elongated arm portion 10. As usual, the post portion 9 is received within and secured by a suitable set screw 11 to the tubular shank I of the front fork, while the arm portion 10 projects forwardly from said post portion 9 at the upper end thereof and extends over and is secured by suitable headed elements 12 to the steering arm 6 at the center thereof. Thus, the connection between the crossbar 6 and supporting member is not conspicuous.

From the foregoing it will be apparent that the spring steel portion 6 of the handle bar will provide the desired cushioning effect for the hands and arms of the rider. At the same time this spring steel bar 6 will cooperate with the supporting member 8 to provide a very sturdy construction.

What I claim as my invention is:

1. A handle bar structure comprising an inverted substantially L-shaped casting, a crossbar crossing the underside of the base of said L and provided at opposite ends with hand grips, and securing means for said crossbar, including spaced fastening elements extending through said crossbar and upwardly into the base of said L.

2. A handle bar structure comprising a crossbar provided at opposite ends with hand grips, and an inverted substantially L-shaped member supporting said crossbar, the base of said L overlying the crossbar substantially midway its ends, and a rigid connection between said crossbar and the base of said L including means extending through one of said parts and into the other.

3. A handle bar structure comprising a crossbar provided at opposite ends with hand grips, and an inverted substantially L-shaped member supporting said crossbar, the base of the L overlying the crossbar substantially midway its ends, and a rigid connection between said crossbar and member including spaced fastening elements extending up through the crossbar into the base of the L.

4. A handle bar structure comprising a crossbar provided with hand grips, and a support for said crossbar including a single inverted L-shaped piece of metal, the upright arm of the L being attachable to a front fork of a velocipede, and the horizontal arm of the L overlying the crossbar substantially midway its ends, and a rigid connection between said crossbar and horizontal arm of the L including means extending through the crossbar and upwardly into the horizontal arm of the L.

5. A handle bar structure comprising a crossbar provided with hand grips, and a support for said crossbar including an inverted substantially L-shaped casting, the upright part of the L being attachable to a front fork of a velocipede, and the horizontal part of the L being disposed substantially at right angles to and overlying the crossbar substantially midway its ends, and a rigid connection between said crossbar and horizontal part of the L including spaced headed elements extending upwardly through the crossbar into the casting.

SAMUEL A. SNELL.